United States Patent [19]
Frei et al.

[11] Patent Number: 4,925,123
[45] Date of Patent: May 15, 1990

[54] SAFETY BELT RETRACTOR WITH TIGHTENING MEANS

[75] Inventors: Bernhard Frei, Waldstetten; Wolf-Dieter Hönl, Böbingen, both of Fed. Rep. of Germany

[73] Assignee: TRW Repa GmbH, Alfdorf, Fed. Rep. of Germany

[21] Appl. No.: 191,261

[22] Filed: May 6, 1988

[30] Foreign Application Priority Data

May 12, 1987 [DE] Fed. Rep. of Germany ....... 3715846

[51] Int. Cl.$^5$ .................... B60R 22/34; B65H 75/48
[52] U.S. Cl. ..................................... 242/107; 280/806
[58] Field of Search ................. 242/107, 107.4 R; 280/806; 297/478

[56] References Cited

U.S. PATENT DOCUMENTS

| | | | |
|---|---|---|---|
| 4,372,501 | 2/1983 | Inukai | 242/107 |
| 4,423,846 | 1/1984 | Föhl | 242/107 |
| 4,445,648 | 5/1984 | Bloch | 280/806 X |
| 4,455,000 | 6/1984 | Nilsson | 242/107 X |
| 4,558,832 | 12/1985 | Nilsson | 242/107 |
| 4,618,108 | 10/1986 | Butenop et al. | 242/107 |
| 4,750,685 | 6/1988 | Frei | 242/107 |
| 4,750,686 | 6/1988 | Föhl | 242/107 |

FOREIGN PATENT DOCUMENTS

| | | | |
|---|---|---|---|
| 93238 | 11/1983 | European Pat. Off. | 242/107.4 R |
| 3215928 | 11/1983 | Fed. Rep. of Germany . | |
| 3231509 | 3/1984 | Fed. Rep. of Germany | 242/107.4 R |
| 3329687 | 3/1985 | Fed. Rep. of Germany | 242/107.4 R |
| 3407378 | 11/1985 | Fed. Rep. of Germany . | |
| 3534048 | 4/1987 | Fed. Rep. of Germany . | |
| 3600001 | 7/1987 | Fed. Rep. of Germany | 280/806 |
| 3600004 | 7/1987 | Fed. Rep. of Germany | 280/806 |
| 2180734 | 4/1987 | United Kingdom | 280/806 |

*Primary Examiner*—Joseph J. Hail, III
*Attorney, Agent, or Firm*—Tarolli, Sundheim & Covell

[57] ABSTRACT

A safety belt retractor is associated with a belt retightener which comprises a coupling mechanism provided between a pulley and the belt spool of the retractor. After a tightening operation the belt spool is disengaged from the pulley. The coupling mechanism consists of a clamping roller mechanism and a coupling pawl functionally in series therewith to combine the fast and reliable response of the clamping roller mechanism with the easy releasability of the coupling pawl.

14 Claims, 5 Drawing Sheets

SAFETY BELT RETRACTOR WITH TIGHTENING MEANS

The invention relates to a safety belt retractor with a tightening means which comprises a drive pulley and a coupling means between the drive pulley and the belt spool having at least one coupling element which is movable between a rest position and a coupling position in which it establishes a non-rotatable connection between belt spool and drive pulley.

In such a safety belt retractor known for example from U.S. Pat. No. 4,423,846 at the periphery of the drive pulley one end of a pulling cable or rope engages, the outer end of which is connected to a linear drive, in particular a piston stroke cylinder drive. Since the tightening means must not impair the takeup function of the safety belt retractor in normal operation the drive pulley is normally uncoupled from the belt spool and is coupled non-rotatably to the belt spool only in a tightening operation by one or more coupling elements. As coupling means a clamping blocking mechanism is used. However, when the tightening has taken place the drive pulley via the clamping blocking mechanism and the drive pulley is in turn prevented from rotation by the tensioned pulling cable. After accident stressing with tightening the safety belt thus remains firmly tightened on the occupant. The tension remaining in the webbing might under some circumstances obstruct the freeing of the occupants from the vehicle.

The present invention provides a safety belt retractor of the above mentioned type wherein the belt spool is reliably decoupled from the tightening drive at the end of a belt tightening operation and can thus be rotated without any restraint from the tightening drive.

This is achieved by the feature that the coupling element after completed tightening is moved under constrained control into its rest position by rotation of the belt spool in the takeup direction relatively to the blocked drive pulley.

The invention is based on the idea that a movement of the coupling element into its rest position caused by rotation of the belt spool in the takeup direction is accompanied by a simultaneous release of the belt spool blocking which is initiated in well known manner by a conventional automatic blocking means in the initial phase of a crash situation.

In a preferred embodiment of the invention the movement of the coupling element into its rest position is effected by a ramp-like control face which on rotation of the belt spool in the takeup direction forces the coupling element into its rest position. The rotation of the belt spool in the takeup direction takes place under the action of the return spring present in any conventional safety belt retractor.

In a particularly simple embodiment of the invention the coupling means consists of a pivotal pawl and an inner toothing surrounding said pawl. The inner toothing is disposed on the belt spool whilst the spool is pivotally mounted on one side of the drive pulley. In one variant of this embodiment the pawl is mounted on the belt spool and co-operates with an outer toothing disposed on the pulley. In each case the pawl is brought firstly at the start of the tightening movement in constrained manner out of its rest position into engagement with the counter toothing and secondly after completed tightening is brought in constrained manner out of engagement with the counter toothing by rotation of the belt spool in the takeup direction. Compared with the fundamentally also possible introduction of the pawl into the counter toothing by centrifugal force the constrained control is advantageous insofar as any tooth bounce is prevented.

In another embodiment of the invention the coupling means consists of two parts which are connected functionally in series, i.e. a clamping blocking mechanism and an additional coupling element which can be constructed as pawl or rolling element. The clamping blocking mechanism ensures that the coupling connection is established within an extremely short time and with high reliability which cannot be achieved with a coupling means operating with teeth because in the latter it is possible for the tooth tips to strike against each other. Although after completed tightening the clamping blocking mechanism cannot be released or can be released only with difficulty, releasing of the coupling connection is ensured with minimum expenditure of force, in particular under the action of the return spring, because to move the additional coupling element into its rest position only small forces are necessary. In particular, a coupling element constructed as pawl or rolling element can easily be moved into its rest position by a ramp-like control face with a few degrees angular rotation of the belt spool in the takeup direction.

Several variants of this embodiment with clamping blocking mechanism and additional coupling element are set forth in the claims. They differ from each other mainly in the relative arrangement of coupling element and ramp-like control face on the belt spool and drive pulley and in an additional intermediate ring.

Further features and advantages of the invention will be apparent from the following description of several embodiments with the aid of the drawings, wherein.

Figure 1:
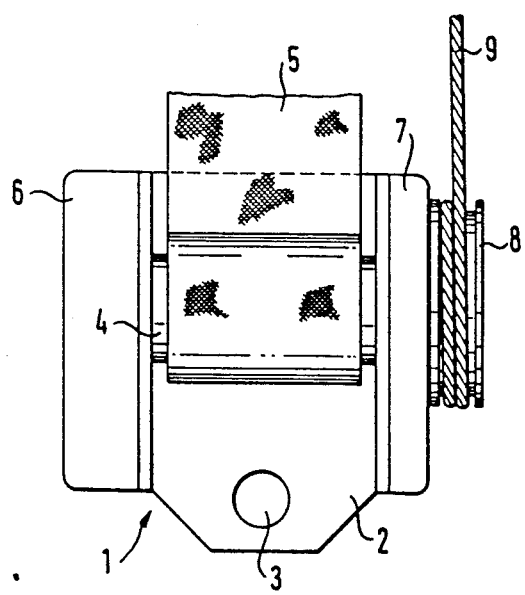
FIG. 1 is a schematic illustration of a safety belt retractor with tightening means.

The safety belt retractor 1 shown in FIG. 1 consists in conventional manner of a U-shaped housing member 2 having a mounting opening 3, a belt spool 4 which is rotatably mounted in the side walls of the housing member 2 and on which the webbing 5 is coiled, a conventional automatic blocking means covered by a lateral housing cap 6, a cable pulley 8 which serves as drive pulley and at the outer periphery of which the one end of a pulling cable 9 engages, the other end of said cable engaging a linear drive, in particular a pyrotechnical piston/cylinder drive, and a coupling means which is covered by a lateral housing cap 7 and by which the belt spool 4 can be coupled to the cable pulley 8.

Figure 3:
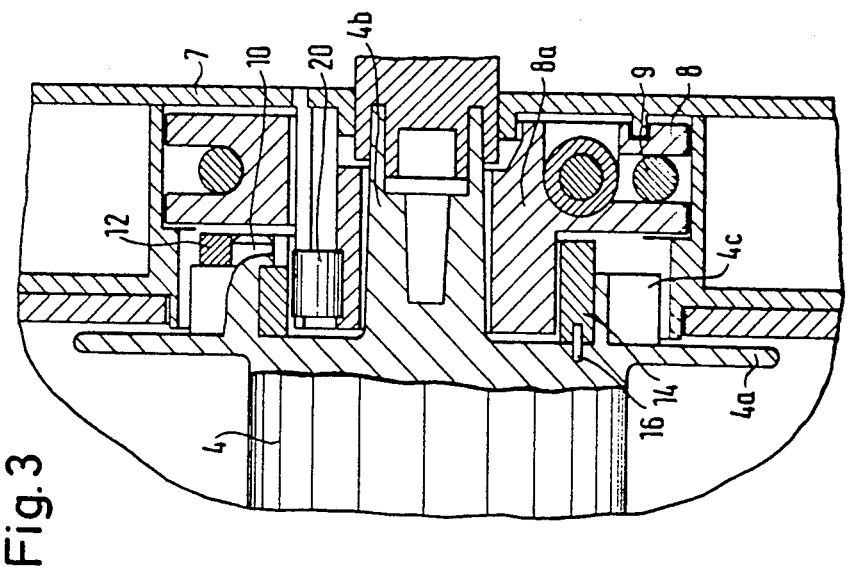
FIG. 3 is an axial section of the same embodiment.
Figure 2:
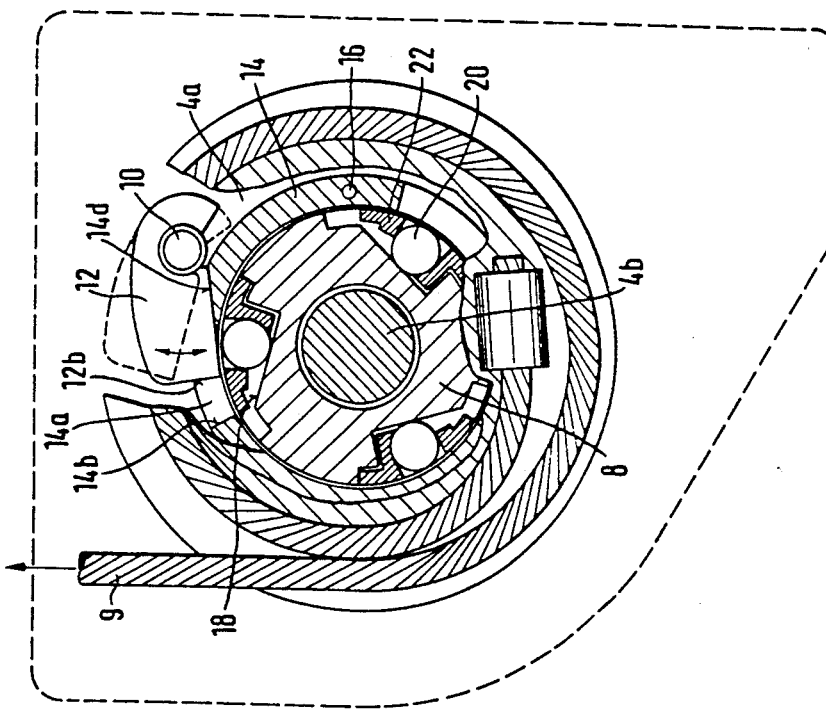
FIG. 2 is a radial section of a first embodiment of the safety belt retractor.

A first embodiment of this coupling means is shown in FIGS. 2 and 3. The belt spool 4 comprises a lateral spool flange 4a and an axial bearing extension 4b on which a hub portion 8a of the cable pulley 8 is rotatably mounted. The spool flange 4a carries three axis-parallel bearing pins 10 which are arranged at equal angular intervals and of which only one is shown in the drawing. On the bearing pin 10 a pawl 12 is pivotally mounted. An intermediate ring 14 is connected releasably to the spool flange by at least one shear pin 16. The intermediate ring 14 surrounds the hub portion 8a of the cable pulley 8 with slight radial spacing. In the region of the pawl 12 the intermediate ring 14 comprises a recess 14a in its periphery. Said recess 14a comprises a radial boundary face 14b which faces a small distance apart a likewise at least approximately radial coupling face 12a of the pawl 12. The recess 14a is bordered on the opposite side by a ramp-like control face 14d on which the radially inner side of the pawl 12 bears.

The hub portion 8a is provided at its outer periphery with three recesses which each have a ramp-like face 18 on which a clamping roller or clamping ball 20 is held in engagement by a cage 22. In a manner known per se the ramp faces 18, the clamping rollers or balls 20 and the inner face of the intermediate ring form a clamping blocking mechanism which on rotation of the hub portion 8a in the clockwise direction couples the intermediate ring 14 locked in rotation to the cable pulley 8. The rotation of the cable pulley 8 in the clockwise direction is caused by tension acting on the pulling cable 9 in the direction designated in FIG. 2 by an arrow in a tightening operation. After shearing off of the shear pins 16 the radial face 14b of the intermediate ring 14 then meets the coupling face 12b of the pawl 12. Via the pawl 12 the spool flange 4a is then entrained so that the belt spool 4 is turned in the takeup direction. After completed tightening the cable pulley 8 and the intermediate ring 14 are fixedly connected together by the clamping blocking mechanism because the latter can only be released again with great difficulty. Nevertheless, the belt spool 4 is freely rotatable in the takeup direction under the action of the return spring (not shown) because the radially inner face of the pawl 12 now runs onto the ramp-like control face 14d of the intermediate ring 14 and the pawl 12 is pivoted radially outwardly into its rest position shown in dashed line in FIG. 2. In its coupling position shown in FIG. 2 in full lines the pawl 12 is held for example by static friction. After the pawl 12 has been presses by the ramp-like control face 14d into its rest position it remains in this position. Since by the rotation of the belt spool through a few angular degrees in the takeup direction 4 not only the pawl 12 was moved into its rest position but at the same time also in well known manner the belt spool blocking by the conventional automatic blocking means was canceled, the belt spool 4 is now freely rotatable in both directions of rotation.

The safety belt retractor according to the invention combines the advantages of a clamping blocking mechanism, which are in particular reliable function and high response speed, with those of a coupling pawl whose coupling engagement with a counter toothing can be released by applying a small force. In spite of the pawl 12 provided additionally to the clamping blocking mechanism comprising an intermediate ring 14 a compact constructional form is achieved. In particular, the clamping blocking mechanism can be accommodated radially within the blocking toothing 4c which is provided on the spool flange 4a and which co-operates with the ratchet pawl (not shown) of the conventional automatic blocking means.

In the embodiment according to FIGS. 2 and 3 the coupling means thus includes between cable pulley 8 and belt spool 4 on the one hand a clamping blocking mechanism and on the other a pawl coupling which lies functionally in series with the clamping blocking mechanism. The clamping blocking mechanism is disposed between the cable pulley 8 and intermediate ring 14 and the pawl coupling between the intermediate ring 14 and the belt spool 4.

Figure 5:
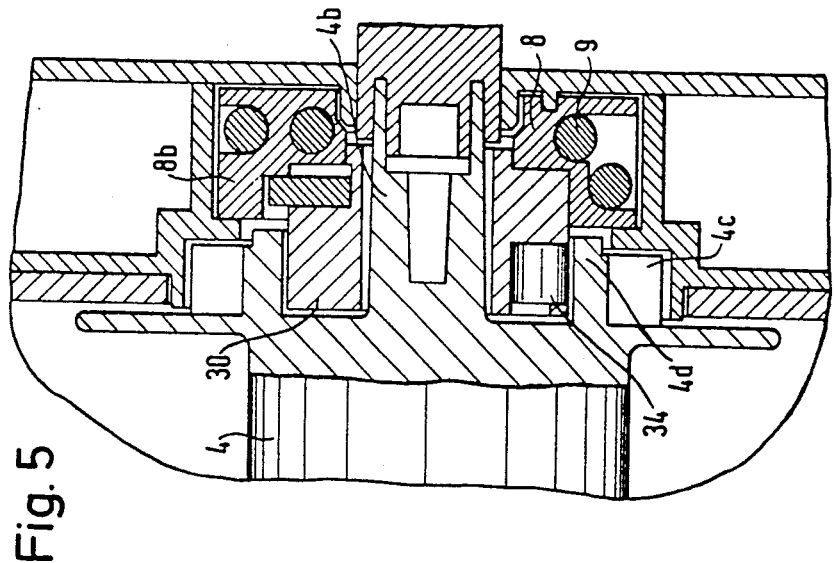
FIG. 5 is an axial partial section of the same embodiment.
Figure 4:
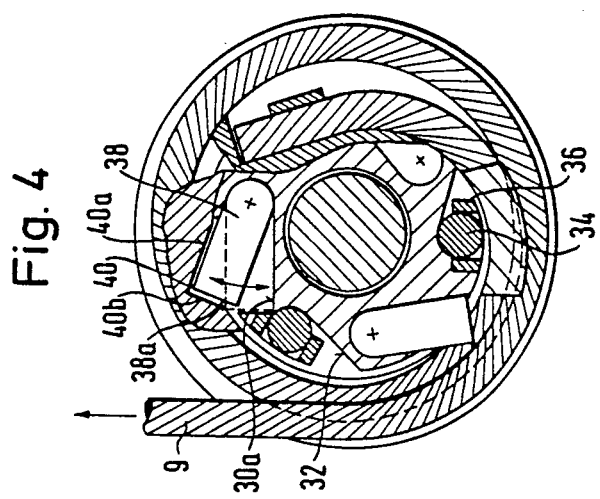
FIG. 4 is a radial partial section of a second embodiment.

In the embodiment according to FIGS. 4 and 5 as well a clamping blocking mechanism and a pawl coupling are arranged functionally in series. However, the clamping blocking mechanism is disposed between the belt spool 4 and the intermediate ring 30 whilst the pawl coupling is disposed between the cable pulley 8 and the intermediate ring 30. The intermediate ring 30 surrounds the axial extension 4b of the belt spool 4. At its outer periphery the intermediate ring 30 comprises recesses having ramp faces 32 on which clamping elements 34 are held in engagement by a cage 36. The clamping elements 34 and the intermediate ring 30 are surrounded by an annular face on the inner side of an annular collar 4d of the belt spool 4. Three pawls 38 are pivotally mounted on the intermediate ring 30. The cable pulley 8 is provided with an annular collar 8b whose inner face surrounds the pawls 38 and is provided with recesses 40 which are shaped to match said pawls 38 and which are formed by two walls 40a and 40b perpendicular to each other. The wall 40b forms a counter face for the coupling face 38a of the pawl 38. The wall 40a forms a ramp-like control face for pivoting the pawl 38 out of its coupling position into its rest position. In FIG. 4 the coupling position is shown in full lines and the rest position in dashed lines. In the rest position the pawls 38 enter the respective associated free space 30a of the intermediate ring 30 to such an extent that they do not strike the cable pulley 8 on rotation of the belt spool 4 and the intermediate ring fixedly connected thereto after a tightening by the clamping blocking mechanism.

The mode of operation of this embodiment is basically the same as that of the embodiment of FIGS. 2 and 3 and will therefore not be described in detail.

Figure 7:
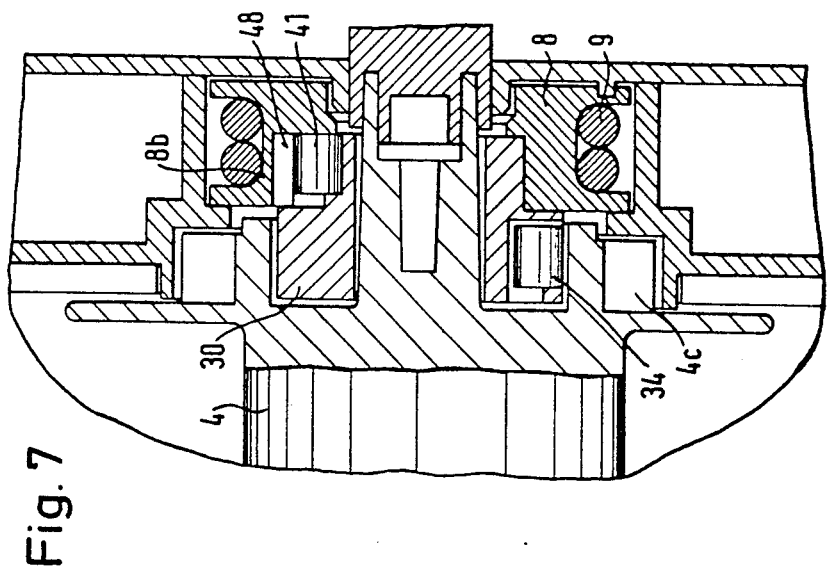
FIG. 7 is an axial partial section of the same embodiment.
Figure 6:
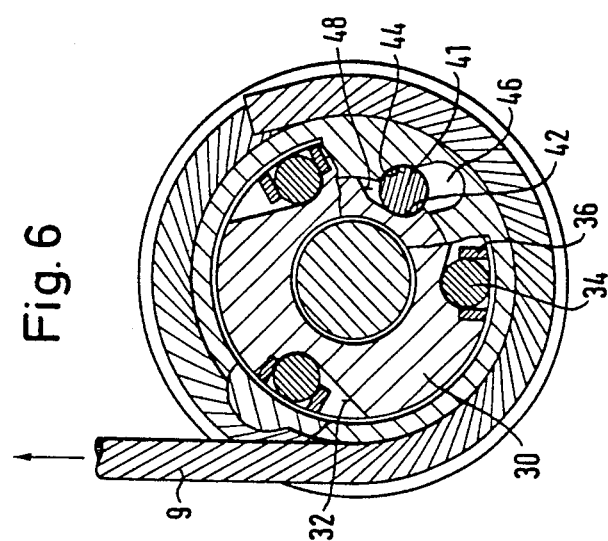
FIG. 6 is a radial partial section of a third embodiment.

In the embodiment according to FIGS. 6 and 7 once again a clamping blocking mechanism and an additional coupling are arranged functionally in series but instead of a pawl coupling a form-locking coupling is used. The clamping blocking mechanism is constructed in the same manner as in the embodiment according to FIGS. 4 and 5 and will therefore not be described again. The form locking is established by three equally angularly spaced cylindrical rolling elements 40, of which only one is shown in the drawings, between the cable pulley 8 and the intermediate ring 30. For this purpose the intermediate ring 30 comprises at its outer periphery and the pulley 8 comprises at the inner side of its annular collar 8b two opposing partially cylindrical receiving faces 42 and 44 respectively which closely surround the rolling elements 40. In the annular collar 8b of the pulley 8 adjoining the receiving face 44 a free space 46 is formed whose shape is adapted to that of the rolling element 40 and whose depth suffices to enable the rolling element 40 to penetrate the free space 46 to such an extent that said element no longer encounters the outer periphery of the intermediate ring 30. In the coupling position shown in FIG. 6 the rolling element 40 is held between the receiving faces 42 and 44. On a tightening the rotational movement of the pulley 8 is transmitted via the receiving face 44 to the rolling element 40 and by the latter via the receiving face 42 to the intermediate ring 30 which in turn is coupled by the clamping blocking mechanism non-rotatably to the belt spool 4. The receiving face 42 terminates on its side opposite the free space 46 in FIG. 6 in a ramp-like control face 48. After effected tightening the belt spool 4 is turned under the action of the return spring in the clockwise direction. It then entrains in this rotation the intermediate ring 30 which is now fixedly connected to it via the clamping blocking mechanism so that the ramp-like control face 48 runs onto the rolling element 40. On further rotation of the intermediate ring 30 through a few angular degrees the rolling element 40 is pushed into the free space 46. In the latter, due to the configuration of the free space 46, it is held in its rest position. Since in this rest position the rolling body is moved out of the path of movement of the intermediate ring 30 and since at the same time by the rotation of the belt spool in the takeup direction the conventional belt spool blocking means has been canceled, the belt spool can now freely rotate.

Figure 8:
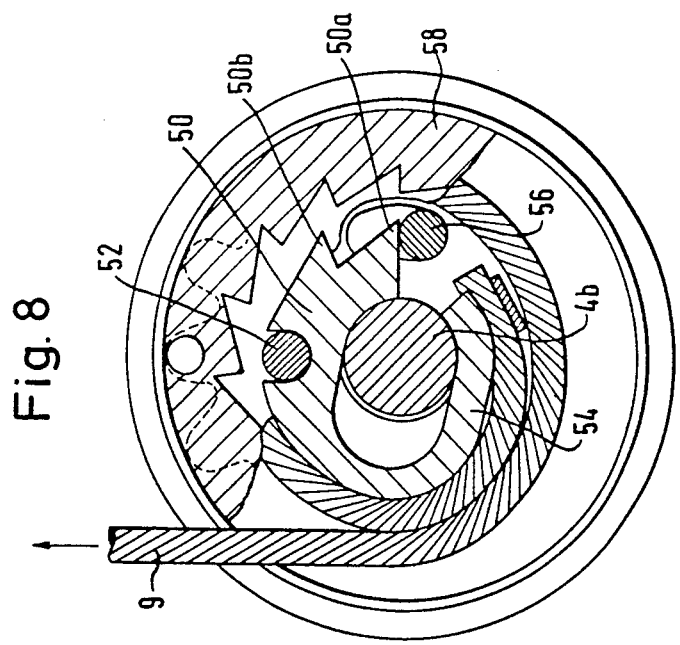
FIG. 8 is a radial partial section of a fourth embodiment.
Figure 9:
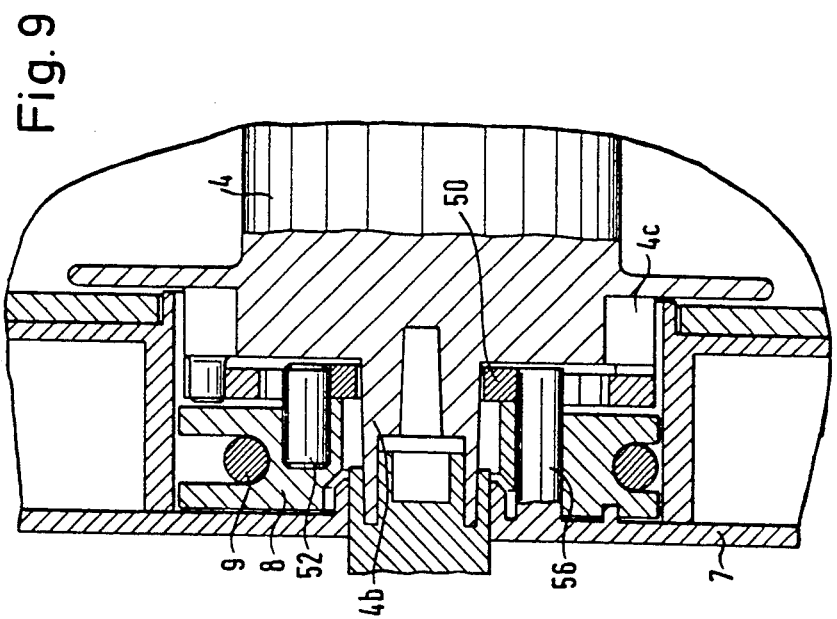
FIG. 9 is an axial partial section of said fourth embodiment of the invention.

In the embodiment according to FIGS. 8 and 9 the coupling means between the belt spool 4 and pulley 8 consists simply of a pawl coupling. A pawl 50 is pivotally mounted about a pivot pin 52 anchored in a side face of the belt spool 4. The pawl 50 comprises two coupling teeth 50a, 50b. By a bent resilient arm 54 of the pawl 50 surrounding the axial extension 4b of the belt spool 4 in slot manner the pivot movement of the pawl 50 is limited and at the same time to a certain extent retarded. In FIG. 8 the pawl 50 is shown in its rest position. In this position it bears with the face of its pawl tooth 50a on a stud-like stop element 56 which is formed as shear pin and projects in the axial direction from the inner side of the housing cover 7. At the outer periphery of the side face of the belt spool 4 a coupling ring 58 provided with an inner toothing is secured. The inner toothing of the coupling ring 58 matches the coulping teeth 50a, 50b. When on tightening the cable 9 is pulled the pulley 8 rotates in the clockwise direction. The pawl 50 tends to follow this rotary movement but is prevented in doing so by engagement on the sheer pin 56 acting as stop element. The pawl 50 must therefore yield with a pivot movement in the anticlockwise direction and as a result the coupling teeth 50a, 50b thereof are introduced in constrained manner into the teeth gaps of the inner toothing of the coupling ring 58. By this constrained control of the pawl 50 any tooth bounce is avoided so that a reliable coupling is established within an extremely short time between the pulley 8 and belt spool 4. After the pawl 50 has been pivoted into its coupling position in engagement with the inner toothing of the coupling ring 58 the full drive load rests on the shear pin 56 which is sheared off by the further rotation. After completed tightening the belt spool 4 is turned under the action of the return spring in the clockwise direction, i.e. the takeup direction. The backs of the coupling teeth 50, 50b are now moved along the backs of the inner toothing of the coupling ring 58 and simultaneously pressed inwardly because said tooth backs now act as ramp-like control faces. After a few angular degrees rotation of the belt spool 4 in the takeup direction the pawl 50 has been pressed completely into its rest position shown in FIG. 8 in which it is held by the arm 54. The belt spool 4 is thus completely decoupled from the pulley 8 and after cancellation of the belt spool blocking is freely rotatable.

What is claimed is:

1. A safety belt retractor having a belt spool rotatably mounted in a frame and an associated belt retightening means which includes a drive pulley, flexible pulling means engaging the periphery of said drive pulley for transforming a pulling action occurring in a belt retightening operation into a rotary movement of said drive pulley, and coupling means provided between said belt spool and said drive pulley and selectively operable between a coupling state for interlocking said belt spool and said drive pulley for joint rotation and a release state wherein said belt spool is free to rotate with respect to said drive pulley, and control means for selectively controlling said coupling means between its coupling and its release state, said control means being responsive to the termination of a retightening operation to control said coupling means to said release state, said coupling means comprises at least one coupling element which is movable between a coupling position and a rest position, said control means being adapted to move said coupling element to its rest position in a constrained manner and having a ramplike control face which on rotation of the belt spool in a belt takeup direction imparts to the coupling element a constrained movement with a radial component in the direction of said rest position, said coupling element being a pawl which is pivotally mounted on a lateral flange of said belt spool and comprises an at least approximately radial coupling face which cooperates with a face opposite thereto of an intermediate ring releasably connected to said belt spool, said intermediate ring being adapted to be interlocked with said drive pulley for joint rotation by a clamping roller mechanism.

2. The safety belt retractor according to claim 1, wherein said ramp-like control face for the constrained movement of said pawl into its rest position is formed on said intermediate ring.

3. The safety belt retractor according to claim 1, wherein said clamping roller mechanism is formed by a hub portion of said drive pulley with recesses formed at its outer periphery and having ramp-like control faces receiving clamping rollers thereon and by the inner face of said intermediate ring surrounding said clamping rollers.

4. The safety belt retractor according to claim 1, wherein said clamping roller mechanism is arranged radially within a blocking toothing of said belt spool.

5. A safety belt retractor having a belt spool rotatably mounted in a frame and an associated belt retightening means which includes a drive pulley, flexible pulling means enagaing the periphery of said drive pulley for transforming a pulling action occuring in a belt retightening operation into a rotary movement of said drive pulley, and coupling means provided between said belt spool and said drive pulley and selectively operable between a coupling state for interlocking said belt spool and said drive pulley for joint rotation and a release state wherein said belt spool is free to rotate with respect to said drive pulley, and control means for selectively controlling said coupling means between its coupling and its release state, said control means being responsive to the termination of a retightening operation to control said coupling means to said release state, said coupling means comprising at least one coupling element which is movable between a coupling position and a rest position, said control means being adapted to move said coupling element to its rest position in a constrained manner and having a ramplike control face which on rotation of the belt spool in a belt takeup direction imparts to the coupling element a constrained movement with a radial component in the direction of said rest position, a clamping roller mechanism, said coupling element being a pawl which is pivotally mounted on an intermediate ring which can be coupled non-rotatably to said belt spool by said clamping roller mechanism, said pawl in its coupling position engaging into a correspondingly shaped recess means connected with said drive pulley for rotation therewith.

6. The safety belt retractor according to claim 5, wherein said ramp-like control face is formed on said recess means.

7. The safety belt retractor according to claim 5, wherein said intermediate ring is provided with a cutout into which said pawl retracts in its rest position.

8. The safety belt retractor according to claim 5, wherein said clamping roller mechanism is formed by said intermediate ring mounted rotatably on a lateral flange of said belt spool, and provided at its outer periphery with recesses comprising ramp-like control faces, by clamping rollers disposed in said recesses and by an annular face of said belt spool surrounding said rollers.

9. A safety belt retractor comprising:
a rotatable belt spool,
a return spring biasing said belt spool in a belt takeup direction,
a drive pulley,
flexible pulling means engaging the periphery of said drive pulley for transforming a pulling action on said flexible pulling means into a retightening rotary movement of said drive pulley, and
coupling means selectively operable between a coupling state for interlocking said belt spool and said drive pulley for joint rotation and a release state wherein said belt spool is free to rotate with respect to said drive pulley,
said coupling means comprising an intermediate ring member mounted for relative rotation with respect to said belt spool for receiving the retightening force of the rotary movement of said drive pulley and transmitting it to said belt spool, a clamping roller coupling mechanism for transmitting retightening force between said intermediate ring member and one of said belt spool and said drive pulley, and at least one coupling element for transmitting retightening force between said intermediate ring member and the other of said belt spool and said drive pulley and being movable between a coupling position and a rest position, said coupling element being moved to its rest portion in response to rotation of said belt spool in said takeup direction under the action of said return spring after a completed retightening operation, said clamping roller coupling mechanism and said coupling element transmitting retightening force in series through said force-transmitting intermediate ring member from said drive pulley to said belt spool in the retightening operation.

10. The safety belt retractor according to claim 9, wherein said coupling element is a pawl.

11. The safety belt retractor according to claim 9 wherein said intermediate ring has a ramp-like control face, and wherein said coupling element is a roller element which in its coupling position locks said drive pulley to said intermediate ring which is mounted rotatably on said belt spool and couplable non-rotatably thereto by said clamping roller mechanism and wherein said roller element in its rest position is urged by said ramp-like control face of said intermediate ring into a recess of said drive pulley and held therein.

12. The safety belt retractor according to claim 9, wherein said ramp-drive control face is formed on a first recess at the periphery of said intermediate ring, said recess lying opposite a complementary recess at the inner periphery of an annular collar connected to said drive pulley, said roller element being disposed in its coupling position between said first and complementary recesses and said recess of said drive pulley being likewise formed at the inner periphery of the annular collar and adjoins the recess formed therein.

13. The safety belt retractor according to claim 9, wherein said flexible pulling means on the periphery is a pulling cable.

14. A safety belt retractor having a belt spool rotatably mounted in a frame and an associated belt retightening means which includes a drive pulley, a return spring biasing said belt spool in a belt takeup direction, flexible pulling means engaging the periphery of said drive pulley for transforming a pulling action occuring in a belt retightening operation into a retightening rotary movement of said drive pulley, and coupling means provided between said belt spool and said drive pulley and selectively operable between a coupling state for interlocking said belt spool and said drive pulley for joint rotation and a release state wherein said belt spool is free to rotate with respect to said drive pulley, said coupling means comprising a force-transmitting intermediate ring member mounted for relative rotation with respect to said belt spool, a clamping roller coupling mechanism transmitting retightening force between said intermediate ring member and one of said belt spool and said drive pulley, at least one coupling element transmitting retightening force between said intermediate ring member and the other of said belt spool and said drive pulley and movable between a coupling position and a rest position, said coupling element being moved to its rest position in constrained manner by rotation of said belt spool in said takeup direction after a completed retightening operation under the action of said return spring, said clamping roller coupling mechanism and said coupling element transmitting retightening force in series through said force-transmitting intermediate ring member from said drive pulley to said belt spool in the retightening operation.

* * * * *

UNITED STATES PATENT AND TRADEMARK OFFICE
CERTIFICATE OF CORRECTION

PATENT NO. : 4,925,123

DATED : May 15, 1990

INVENTOR(S) : Bernhard Frei and Wolf-Dieter Honl

It is certified that error appears in the above-identified patent and that said Letters Patent is hereby corrected as shown below:

Column 6, Line 52, Claim 5, change "enagaing" to --engaging--.

Column 7, Line 53, Claim 9, change "portion" to --position--.

Signed and Sealed this

Thirtieth Day of July, 1991

*Attest:*

HARRY F. MANBECK, JR.

*Attesting Officer*     *Commissioner of Patents and Trademarks*